US009569689B2

(12) United States Patent
Kato et al.

(10) Patent No.: US 9,569,689 B2
(45) Date of Patent: Feb. 14, 2017

(54) IMAGE PROCESSING FOR PRODUCTIVITY APPLICATIONS

(71) Applicant: Microsoft Corporation, Redmond, WA (US)

(72) Inventors: Seiichi Kato, Tokyo (JP); Yasufumi Shiraishi, Tokyo (JP); Daniel J. Moffitt, Tokyo (JP); Kenji Nikaido, Tokyo (JP); Daniel Eduardo Martinez, Higashi Magome (JP); Lu Yuan, Beijing (CN); Jiangyu Liu, Beijing (CN); Aleksandar B. Tomic, Belgrade (RS); Ivan Stojiljkovic, Belgrade (RS); Zhengyou Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 14/513,820

(22) Filed: Oct. 14, 2014

(65) Prior Publication Data
US 2015/0131903 A1    May 14, 2015

Related U.S. Application Data

(63) Continuation of application No. PCT/CN2013/087128, filed on Nov. 14, 2013.

(51) Int. Cl.
*G06K 9/00* (2006.01)
*G06K 9/46* (2006.01)
(Continued)

(52) U.S. Cl.
CPC ............ *G06K 9/4647* (2013.01); *G06K 9/3275* (2013.01); *G06T 5/008* (2013.01); *G06T 5/40* (2013.01);
(Continued)

(58) Field of Classification Search
USPC .................................................. 382/224–228
See application file for complete search history.

(56) References Cited

U.S. PATENT DOCUMENTS 5,528,290 A * 6/1996 Saund ...................... G06K 9/20
348/218.1
5,790,114 A    8/1998 Geaghan et al.
(Continued)

FOREIGN PATENT DOCUMENTS

WO    2008006188    1/2008
WO    2011037724    3/2011

OTHER PUBLICATIONS

Zhang, et al., "Notetaking with a Camera: Whiteboard Scanning and Image Enhancement" In Proceedings of IEEE International Conference on Acoustics, Speech, and Signal Processing , May 17, 2004, 4 pages.
(Continued)

*Primary Examiner* — Alex Liew
(74) *Attorney, Agent, or Firm* — Monica Adjemian; Tom Wong; Micky Minhas

(57) ABSTRACT

Image processing for productivity applications is provided. An image may be received by a computing device. The computing device may detect the edges comprising the received image and adjust the image based on a skew state of the detected edges. The computing device may then process the adjusted image to correct imbalances. The computing device may then assign an image classification to the processed image. The computing device may then adjust the processed image based on the assigned image classification.

20 Claims, 11 Drawing Sheets

(51) Int. Cl.
  *G06T 7/40*  (2006.01)
  *G06T 5/00*  (2006.01)
  *G06T 5/40*  (2006.01)
  *G06K 9/32*  (2006.01)

(52) U.S. Cl.
  CPC ..... *G06T 7/408* (2013.01); *G06T 2207/20021* (2013.01); *G06T 2207/30176* (2013.01)

(56) References Cited

U.S. PATENT DOCUMENTS

| | | | |
|---|---|---|---|
| 6,318,825 | B1 | 11/2001 | Carau, Sr. |
| 7,171,056 | B2* | 1/2007 | Zhang ................. G06K 9/32 382/266 |
| 7,209,149 | B2 | 4/2007 | Jogo |
| 7,724,953 | B2 | 5/2010 | Li et al. |
| 8,345,106 | B2 | 1/2013 | Nijemcevic et al. |
| 8,373,905 | B2 | 2/2013 | Erol et al. |
| 8,531,733 | B2 | 9/2013 | Fan et al. |
| 2002/0149808 | A1 | 10/2002 | Pilu |
| 2006/0092474 | A1* | 5/2006 | Ramsay ................. G06T 5/00 358/3.27 |
| 2006/0264236 | A1 | 11/2006 | Mutz |
| 2007/0081081 | A1 | 4/2007 | Cheng |
| 2007/0106952 | A1 | 5/2007 | Matas et al. |
| 2007/0217701 | A1* | 9/2007 | Liu ................. G06K 9/38 382/234 |
| 2007/0269124 | A1* | 11/2007 | Li ................. G06K 9/38 382/254 |
| 2009/0161172 | A1* | 6/2009 | Mizutani ................. G06T 5/40 358/466 |
| 2009/0244278 | A1 | 10/2009 | Taneja et al. |
| 2011/0075168 | A1 | 3/2011 | Ikari |
| 2011/0142352 | A1 | 6/2011 | Lee |
| 2013/0182296 | A1 | 7/2013 | Masaki et al. |
| 2013/0235076 | A1 | 9/2013 | Cherna |
| 2014/0125856 | A1 | 5/2014 | Kim |
| 2014/0169668 | A1* | 6/2014 | Vugdelija ............. G06F 3/0425 382/165 |
| 2014/0304595 | A1 | 10/2014 | Balev |
| 2015/0135137 | A1* | 5/2015 | Miwa ................. G06T 11/60 715/808 |

OTHER PUBLICATIONS

Zhang, et al., "Whiteboard It! Convert Whiteboard Content into an Electronic Document", Published on: Aug. 12, 2002, Available at: http://research.microsoft.com/en-us/um/people/zhang/WhiteboardIt/WhiteboardIt.pdf; 16 pages.

Zhang, et al., "Whiteboard Scanning and Image Enhancement", In Technical Report MSR-TR-2003-39, Jun. 2003, 25 pages.

Oliveira, et al., "Tableau—Processing Teaching-board Images Acquired with Portable Digital Cameras" In Proceedings of Second International IAPR Workshop on Camera-Based Document Analysis and Recognition, Sep. 2007, 8 pages.

Kumar, Ishan, "An Integrated System to Identify and Recognize Vehicle Number Plate", In Thesis for Master of Technology, Jul. 2013, 60 pages.

European Communication in Application No. 14802288.2, mailed Jun. 30, 2016, 2 pages.

U.S. Appl. No. 14/177,926, Office Action mailed Apr. 29, 2016, 14 pages.

PCT International Search Report in PCT/CN2013/087128, mailed May 28, 2014, 11 pages.

U.S. Appl. No. 14/077,926, Office Action mailed Dec. 16, 2015, 12 pages.

U.S. Appl. No. 14/077,926, Amendent and Response filed Mar. 15, 2016, 14 pages.

PCT 2nd Written Opinion in PCT/US2014/063968, Oct. 13, 2015, 6 pages.

"Productivity Software Definition from PCT Magazine Encyclopedia", May 10, 2013, 2 pages.

"ScanClip for iPhone/ for Android", Available at: http://mediadrive.jp/english/products/scanclip/index.html, May 12, 2012, 7 pages.

Zhang, et al.,"Whiteboard Scanning and Image Enhancement Sync", In Technical Report, MSR-TR-2003-39, May 2003, 27 pages.

"Whiteboard Photo", Available at: http://www.graphics.com/news-old/whiteboard-photo, Mar. 23, 2002, 7 pages.

"iTunes is the Worlds Easiest Way to Organize and Add to your Digital Media Collection", Available at: https://itunes.apple.com/us/app/everclipper/id412373438?mt=8, Oct. 14, 2013, 2 pages.

Clarified, "Skitch Can Now Share Drawings to Your Evemote Notebook", Available at: http://www.iclarified.com/entry/index.php?enid=20802, Mar. 20, 2012, 2 pages.

"CamScanner HD—Scanner", Available at: https://play.google.com/store/apps/details?id=com.intsig.camscannerhd&hl=en, Apr. 16, 2013, 2 pages.

"Mobile Doc Scanner Lite", Available at: https://play.google.com/store/apps/details?id=com.stoik.mdscanlite, Sep. 12, 2013, 2 pages.

Parker, Jason,"Notability—Take Notes & Annotate PDFs with Dropbox & Google Drive Sync", Available at: http://download.cnet.com/Notability-Take-Notes-Annotate-PDFs-with-Dropbox-Google-Drive-Sync/3000-2124_4-75176954.html#ixzz2hPbeHUeg, May 23, 2013, 6 pages.

U.S. Appl. No. 10/372,488, Office Action mailed Aug. 9, 2006, 6 pages.

U.S. Appl. No. 10/372,488, Amendment and Response filed Oct. 30, 2006, 21 pages.

U.S. Appl. No. 10/372,448, Notice of Allowance mailed Nov. 17, 2006, 3 pages.

PCT International Search Report in PCT/US2014063968, mailed Feb. 9, 2015, 11 pages.

* cited by examiner

IMAGE PROCESSING FOR PRODUCTIVITY APPLICATIONS

CROSS-REFERENCE TO RELATED APPLICATIONS

This application is a continuation of International Patent Application No. PCT/CN2013/087128, filed 14 Nov. 2013, and entitled "Image Processing for Productivity Applications," the disclosure of which is hereby incorporated herein, in its entirety, by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile computing devices, such as smartphones and tablets, are increasingly being utilized in lieu of standalone cameras for capturing photographs of whiteboards, blackboards (i.e., a writing surface having a colored background) and documents in association with various productivity scenarios in the workplace (e.g., meetings comprising slide presentations, brainstorming sessions and the like). The captured photographic images may then be utilized in one or more productivity applications for generating electronic documents. The aforementioned capturing of photographic images however, suffers from a number of drawbacks. For example, many photographs must be taken at an angle (which may be due to the physical dimension limitations of the room in which a user is located) as well as in less than ideal lighting conditions (e.g., due to glare from incident lights in a meeting room). As a result, captured photographic images often contain unwanted perspective skews as well as unwanted regions (e.g., walls outside a whiteboard frame or table surfaces outside a document page boundary) which must be rectified prior to utilizing the images in external productivity applications. Moreover, captured photographic images may contain reflections of incident light residuals thereby making it necessary for these images to be "cleaned up" prior to being consumed by productivity application software. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for image processing for productivity applications. An image may be received by a computing device. The computing device may detect the edges comprising the received image and adjust the image based on a skew state of the detected edges. The computing device may then process the adjusted image to correct imbalances. The computing device may then assign an image classification, selected from one or more image categories, to the processed image. The computing device may then adjust the processed image based on the assigned image classification.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for image processing for productivity applications. An image may be received by a computing device. The computing device may detect the edges comprising the received image and adjust the image based on a skew state of the detected edges. The computing device may then process the adjusted image to correct imbalances. The computing device may then assign an image classification, selected from one or more image categories, to the processed image. The computing device may then adjust the processed image based on the assigned image classification.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
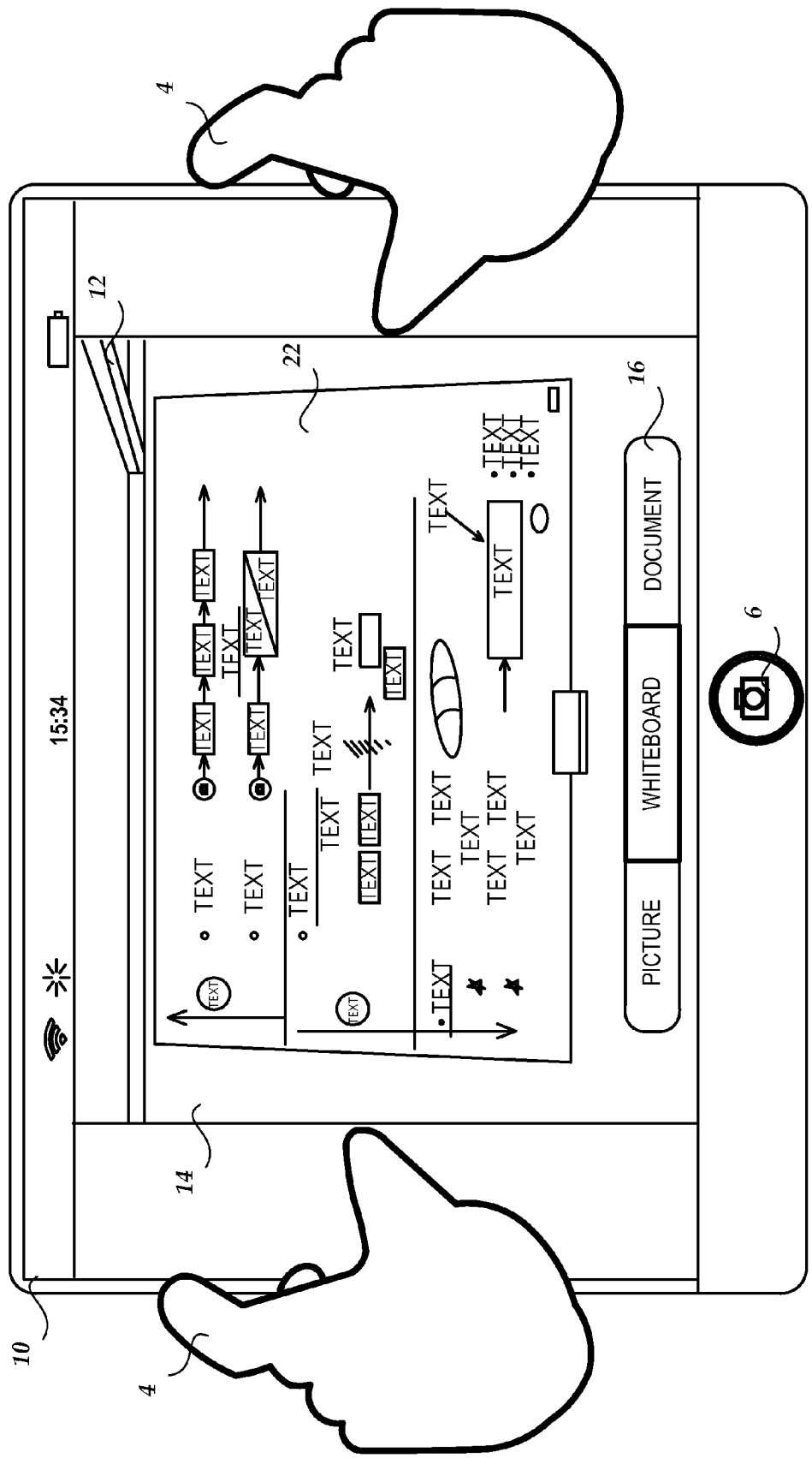
FIG. 1A shows a screen display of a computing device which includes a user interface for capturing an image for processing, in accordance with an embodiment.

FIG. 1A shows a screen display 14 of a computing device 10 which includes a user interface for capturing an image for processing, in accordance with an embodiment. The user interface may include user controls 15, 17 and 19. User control 15 may be utilized to select an image processing mode configured for standard photographic images, user control 17 may be utilized to select an image processing mode configured for whiteboard images and user control 19 may be utilized to select an image processing mode configured for document images. In accordance with various embodiments, the selection of the user controls 15, 17 and 19 may be made by any number of gestures including tapping and swiping gestures. As shown in FIG. 1, the user control 17 has been selected for whiteboard image processing and a user (represented by hands 4) is preparing to capture an image of whiteboard 22 which may be, for example, mounted on the wall of a meeting room having a ceiling 2. The user may then capture the image of the whiteboard 22 using image capture button 6.

Figure 1B:
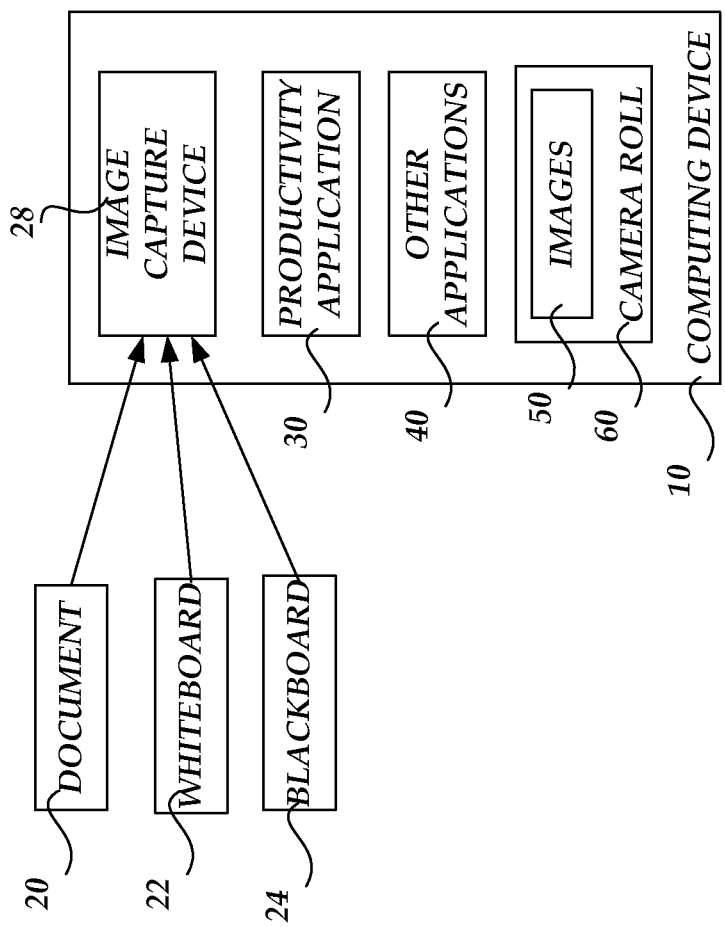
FIG. 1B is a block diagram illustrating a computing system architecture for image processing for productivity applications, in accordance with an embodiment.

FIG. 1B is a block diagram illustrating a computing system architecture for performing image processing for productivity applications, in accordance with an embodiment. The computing system architecture includes the computing device 10. The computing device 10 may comprise an image capture device 28 (e.g., a camera or web cam), productivity application 30, other applications 40 and a camera roll 60 which may comprise a folder on the computing device 10 which stores captured images 50. The productivity application 30 may be configured to utilize the image capture device 28 for capturing photographs or video of document 20, whiteboard 22 and/or blackboard 24 and to further store the photographs or video as images for immediate image processing (e.g., in the camera roll 60 as the images 50) or for later retrieval and image processing. It should be understood that, in an alternative embodiment, the images 50 on the computing device 10 may also comprise previously stored images for later retrieval and image processing.

In accordance with an embodiment, the document 20 may comprise a physical document (e.g., paper) containing information discussed during a meeting or presentation in an office, meeting room, school classroom or other work environment. The whiteboard 22 may comprise a physical markerboard, dry-erase board, dry-wipe board or pen-board utilized for recording notes, sketches, etc. during a meeting or presentation in an office, meeting room, school classroom or other work environment. The blackboard 24 may be similar to the whiteboard 22 except that it comprises a non-white (e.g., colored) surface.

As will be described in greater detail below, the productivity application 30, in accordance with an embodiment, may comprise a free-form information gathering and multi-user collaboration application program configured for capturing notes (handwritten or typed) and drawings from the document 20, the whiteboard 22 and/or the blackboard 24 as images, and which is further configured further processing the images so that they may be utilized by the productivity application 30 and/or the other applications 40. In accordance with an embodiment, the productivity application 30 may comprise the ONENOTE note-taking software from MICROSOFT CORPORATION of Redmond Wash. It should be understood, however, that other productivity applications (including those from other manufacturers) may alternatively be utilized in accordance with the various embodiments described herein. It should be understood that the other applications 40 may include additional productivity application software which may receive the processed images from the productivity application 30. For example, the other applications 40 may include, without limitation, word processing software, presentation graphics software, spreadsheet software, diagramming software, project management software, publishing software and personal information management software. It should be appreciated that the aforementioned software applications may comprise individual application programs or alternatively, may be incorporated into a suite of applications such as the OFFICE application program suite from MICROSOFT CORPORATION of Redmond, Wash.

Figure 2:
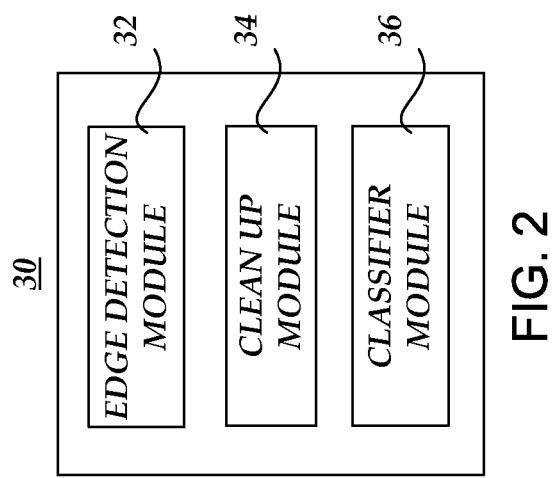
FIG. 2 is a block diagram illustrating various program modules utilized by the application of FIG. 1, in accordance with an embodiment.

FIG. 2 is a block diagram illustrating various program modules utilized by the productivity application 30 of FIG. 1, in accordance with an embodiment. As will be described in greater detail below, the productivity application 30 may comprise an edge detection module 32, a cleanup module 34 and a classifier module 36. Each of the aforementioned program modules may be configured to execute on or more algorithms for improving image quality with respect to images captured by the image capture device 28 and/or retrieved from the camera roll 60. For example, the edge detection module may be configured to execute a quadrilateral edge detection algorithm to detect a whiteboard/document boundary and to crop/rectify a skewed image to a rectangle. The cleanup module 34 may be configured to execute an image cleanup algorithm for adjusting the color balance of a whiteboard/document by applying tuned color effects through a histogram analysis of a photograph (i.e., by calculating white point or white level, black point or black level and contrast) and for performing color adjustment and estimating shadows/highlights. It should be appreciated that the application of the aforementioned improves the readability of an image. The classifier module 36 may be configured to execute an object classifier algorithm for distinguishing between whiteboard, blackboard, document and negative images for image cleanup.

Figure 3:
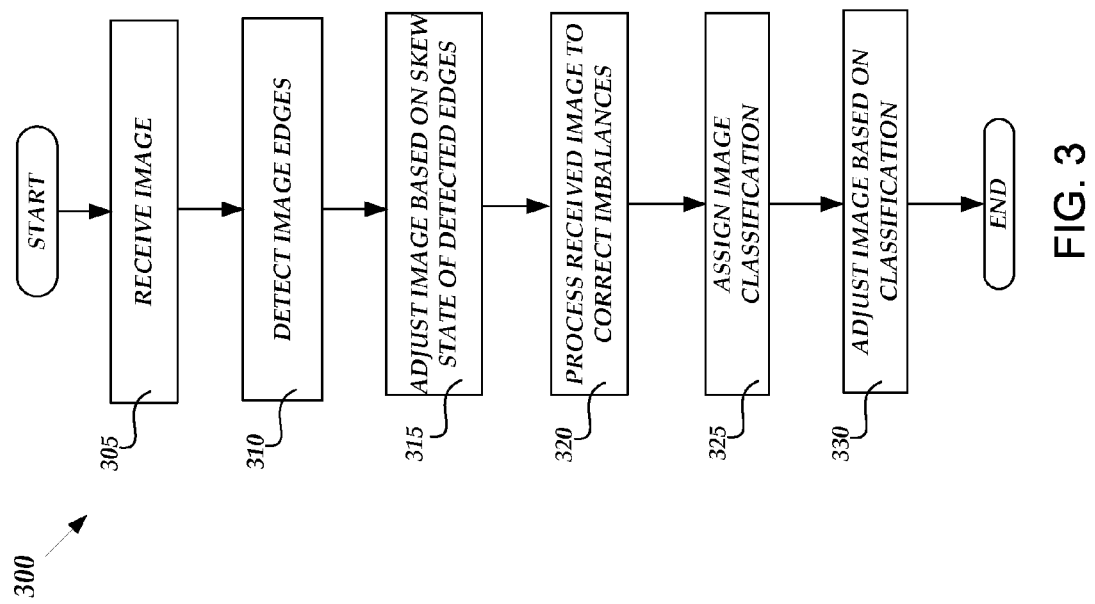
FIG. 3 is a flow diagram illustrating a routine for performing image processing for productivity applications, in accordance with an embodiment.

FIG. 3 is a flow diagram illustrating a routine 300 for performing image processing for productivity applications, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-6 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 300 begins at operation 305, where the productivity application 30 executing on the computing device 10, may receive an image 50 from the image capture device 28 (i.e., from the camera roll 60. The received image may comprise a document image or photograph of the document 20, a whiteboard image or photograph of the whiteboard 22 or a blackboard image or photograph of the blackboard 24.

From operation 305, the routine 300 continues to operation 310, where the productivity application 30 executing on the computing device 10, may detect the edges comprising the received image. In particular, and as will be discussed in greater detail below with respect to FIG. 4, the productivity application 30 may execute an edge detection algorithm to detect any skewed image boundaries (e.g., for photographs taken at an angle).

From operation 310, the routine 300 continues to operation 315, where the productivity application 30 executing on the computing device 10, may adjust the received image based on a skew state of the edges detected at operation 310. In particular, and as will be discussed in greater detail below with respect to FIG. 4, the productivity application 30 may execute the edge detection algorithm to crop/rectify the skewed image boundaries to a rectangle in order to correct perspective distortion.

From operation 315, the routine 300 continues to operation 320, where the productivity application 30 executing on the computing device 10, may process the received image to correct imbalances (i.e., image cleanup). In particular, and as will be discussed in greater detail below with respect to FIG. 5, the productivity application 30 may execute an image cleanup algorithm to apply color and other adjustments for improving image readability.

From operation 320, the routine 300 continues to operation 325, where the productivity application 30 executing on the computing device 10, may assign an image classification, selected from one or more image categories, to the received image. In particular, and as will be discussed in greater detail below with respect to FIG. 6, the productivity application 30 may execute an object classifier algorithm to distinguish between whiteboard, blackboard, document and negative images.

From operation 325, the routine 300 continues to operation 330, where the productivity application 30 executing on the computing device 10, may adjust the received image based on the image classification assigned at operation 325. It should be understood that, in accordance with an embodiment, the productivity application 30 may be pre-configured for processing document and whiteboard images (e.g., images having a white or light background) for image cleanup. Thus, for example, if a cleaned up image is subsequently classified as a blackboard image, the productivity application 30 may be configured to adjust a previously applied cleanup algorithm accordingly. From operation 330, the routine 300 then ends.

Figure 4:
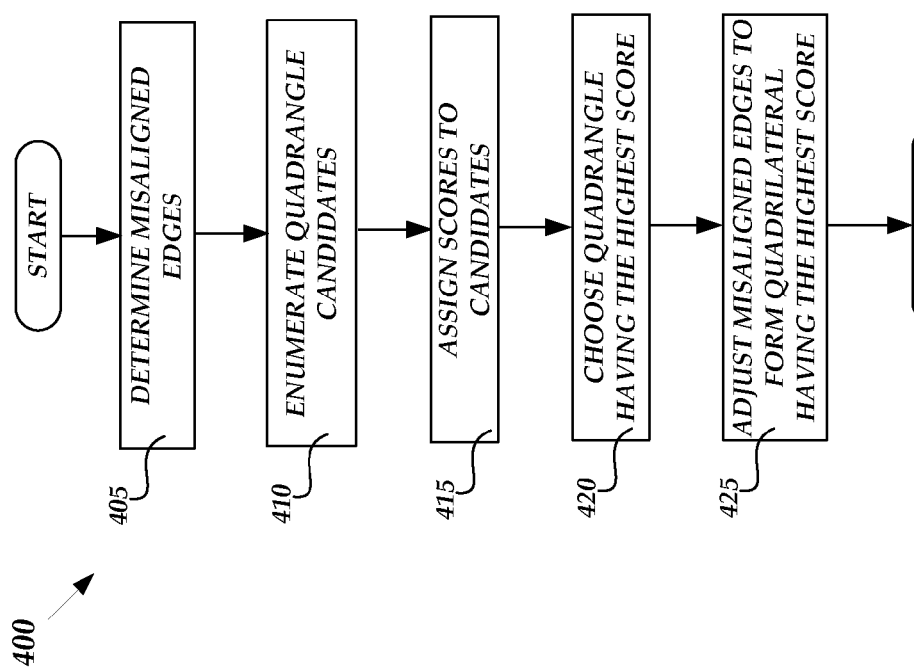
FIG. 4 is a flow diagram illustrating a routine for performing image edge detection and rectification, in accordance with an embodiment.

FIG. 4 is a flow diagram illustrating a routine 400 for performing image edge detection and rectification, in accordance with an embodiment. The routine 400 begins at operation 405, where the productivity application 30 executing on the computing device 10, may determine misaligned edges for a received image. In particular, the productivity application 30 may utilize an edge detection algorithm to determine if any borders comprising an image are skewed.

From operation 405, the routine 400 continues to operation 410, where the productivity application 30 executing on the computing device 10, may enumerate quadrangle candidates for adjusting the skewed image borders detected at operation 405. In particular, the productivity application 30 may utilize the aforementioned edge detection algorithm to enumerate or "rank" possible quadrangle candidates for the left, top, right and bottom edges of an image. In one embodiment, quadrangle candidates having opposing edges would be too close to each other (e.g., a ratio of diagonals is outside of a predetermined range) may be discarded.

From operation 410, the routine 400 continues to operation 415, where the productivity application 30 executing on the computing device 10, may assign scores to the quadrangle candidates enumerated at operation 410. In particular, the productivity application 30 may utilize the aforementioned edge detection algorithm to assign scores to the candidates.

From operation 415, the routine 400 continues to operation 420, where the productivity application 30 executing on the computing device 10, may choose the quadrangle having the highest score. In one embodiment, the productivity application 30 may utilize the following heuristics may be utilized when choosing the best quadrangle candidate: (1) Higher scores are given to quadrangles having line segments that don't interact with other line segments; (2) Higher scores are given to quadrangles having line segments that end near quadrangle corners; (3) The area of the quadrangle is taken into account when assigning scores.

Figure 5:
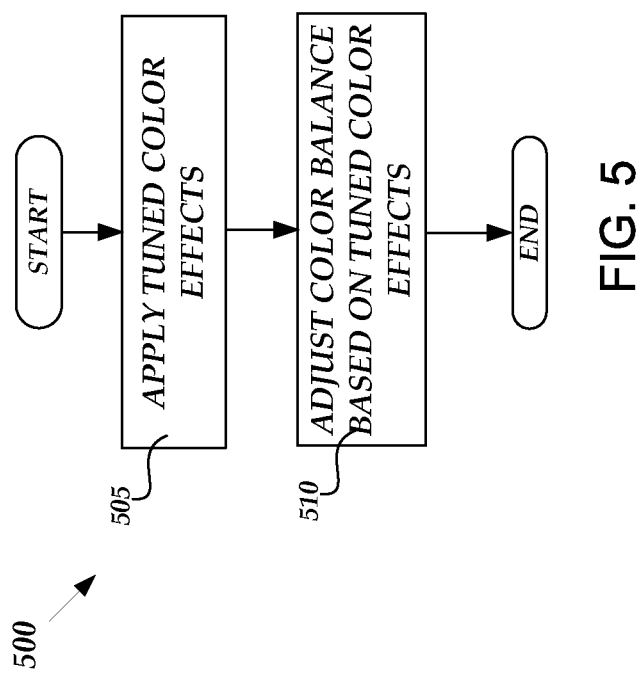
FIG. 5 is a flow diagram illustrating a routine for performing image processing cleanup, in accordance with an embodiment.

From operation 420, the routine 400 continues to operation 425, where the productivity application 30 executing on the computing device 10, may adjust the misaligned edges detected at operation 405 to form a quadrilateral corresponding to the candidate having the highest score. In one embodiment, the productivity application 30 may perform the aforementioned adjustment using the following factors: (1) Utilize line detection algorithms based on constructing curves and simplifying them into lines; (2) Utilize line merging when necessary (e.g., when one edges of the quadrilateral is made up of multiple lines having spaces between them—it should be understood that line merging may be further based on the following sub-factors: (a) A threshold of allowed space between neighboring endpoints of multiple lines; (b) A threshold of an allowed difference in an angle between multiple lines; (c) A threshold of allowed space between multiple points intersected by a line perpendicular to multiple lines (e.g., the distance between two lines if both were extended); (3) Smooth out curves and edges by removing small breaks between lines (e.g., by shrinking high-resolution photographs); (4) Allow the edges of a photograph to be part of the quadrilateral and adjusting a preference value for edges within the photograph (e.g., for images, such as documents, where one or more of the correct edges are the edge of the photograph itself); (5) Leverage brightness from the direction of the edges detected (i.e., by assuming an image is either brighter or darker than the surrounding area, a set of lines may be examined and a determination made as to which are candidates for left edges versus right edges and which are candidates for top edges versus bottom edges); and (6) Enforce consistent brightness by utilizing angle information to enforce a consistent direction and by rejecting quadrangle candidates that do not follow the aforementioned rule (e.g., a whiteboard or a white document may generally having edges pointing inward while a blackboard or a dark document should generally have edges pointing outward—it should be appreciated that this may reduce cases in which straight lines inside or outside of a whiteboard/document are mistakenly used as an edge). It should further be understood that the productivity application 30 may make various line assumptions when adjusting forming a quadrilateral. These assumptions may include: (1) A distance from the left side that the left edge of the quadrilateral may be located (e.g., the left 50% of a photograph); (2) A maximum angle for an edge of the quadrilateral (e.g., vertical edges for whiteboards may be taken standing up and horizontal edges for documents may be taken from above); (3) Allowing edges to be curved (i.e., if a line deviates too far from a straight line then it may be broken up into shorter line segments—it should be appreciated that this may be utilized for documents as they are likely to have curved boundaries due to paper often not being perfectly flat). It should be further understood that the productivity application 30 may validate the quadrilateral corresponding to the highest score. In particular, each photograph or image may have a documented set of four coordinates and the validation will determine how far off each detected image is from predetermined expectations and give an overall score FIG. 5 is a flow diagram illustrating a routine 500 for performing image processing cleanup, in accordance with an embodiment. The routine 500 begins at operation 505, where the productivity application 30 executing on the computing device 10, may apply tuned color effects to an image. In particular, the productivity application 30 may perform a histogram analysis of an image (e.g., a photograph) by calculating white point or white level, black point or black level and contrast.

From operation 505, the routine 500 continues to operation 510, where the productivity application 30 executing on the computing device 10, may adjust a color balance of the image based on tuned color effects. In particular, the productivity application 30 may utilize the histogram analysis performed at operation 505 to perform color adjustment and estimate shadows/highlights for an image. It should be understood that the aforementioned adjustments may result in a processed image with improved brightness, contrast and tone, which collectively improves image readability. In accordance with an embodiment, different image cleanup algorithms may be utilized for document images and whiteboard images, respectively. For example, a document image cleanup algorithm may include the following: (1) Dividing the image into segmented regions and grouping them into exposure zones; (2) calculating the brightest and darkest regions as well as the contrast of the image; and (3) Clamping threshold values of color effects (to ensure that the effects are not excessively applied) which are customized for documents. In particular, it should be understood that the document image cleanup algorithm may feature a zone region-based optimal estimation of exposure evaluation approach. This approach segments a photograph (e.g., a document image) into several regions and groups them in to exposure zones. The algorithm may then calculate the brightest, darkest and contrast areas of the photograph. It should be appreciated that the aforementioned approach considers both the visibility of individual regions and the relative contrast between regions for optimal exposure color cast adjustments, thereby preserving details and achieving optimal outputs. Furthermore, the algorithm may clamp threshold values of color, customized for documents, to ensure that the color effects are not over applied to the photograph.

An illustrative whiteboard image cleanup algorithm may include: (1) Applying white balance with customized parameter values (e.g., cell size and table size) to remove background noises, stains and glare; (2) applying color effects with customized parameter values (e.g., saturation, shadow) to moderate whiteness level and make pen strokes more colorful; and (3) Clamping threshold values of color effects (to ensure that the effects are not excessively applied) which are customized for whiteboards. From operation 510, the routine 500 then ends.

Figure 6:
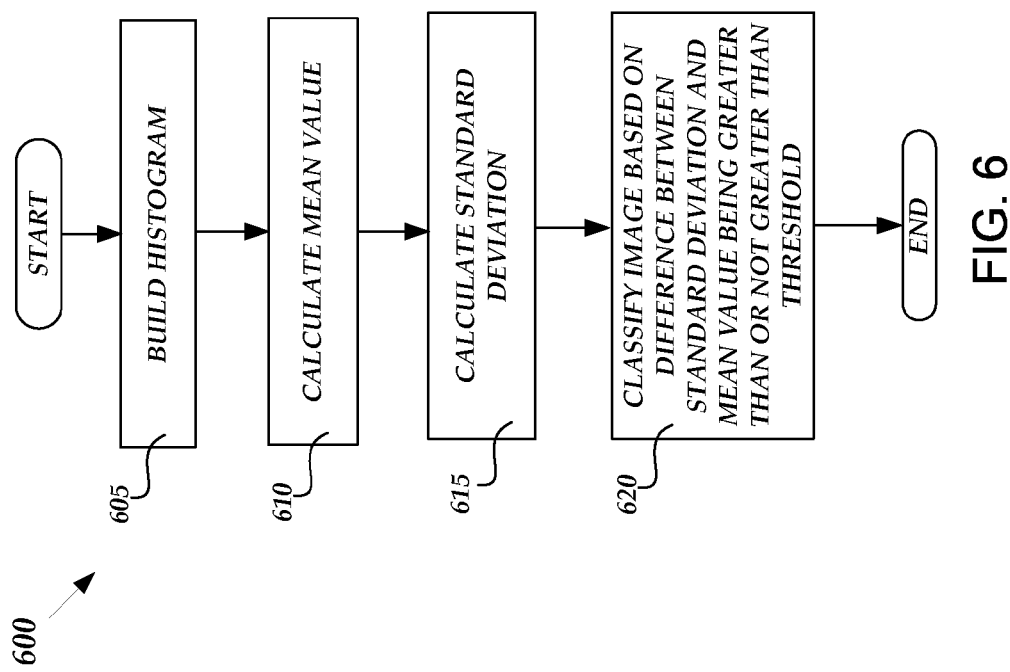
FIG. 6 is a flow diagram illustrating a routine for performing image classification, in accordance with an embodiment.

FIG. 6 is a flow diagram illustrating a routine 600 for performing image classification, in accordance with an embodiment. The routine 600 begins at operation 605, where the productivity application 30 executing on the computing device 10, may build a histogram of color values from an image to determine a brightness level. In one embodiment, the histogram may be constructed of RGB color codes to a tonal range of [0, 255].

From operation 605, the routine 600 continues to operation 610, where the productivity application 30 executing on the computing device 10, may calculate a mean value based on the histogram.

From operation 610, the routine 600 continues to operation 615, where the productivity application 30 executing on the computing device 10, may calculate the standard deviation of the calculated mean as follows: stdev SQRT(SUM ((mean−value)^2).

From operation 615, the routine 600 continues to operation 620, where the productivity application 30 executing on the computing device 10, may classify the image based on the difference between the mean calculated at operation 610 and the standard deviation calculated at operation 615 (e.g., mean−stdev) being greater than or not greater than a threshold. If the aforementioned difference is greater than the threshold, then the image is classified as a whiteboard image. On the other hand, if the aforementioned difference is not greater than the threshold, then the image is classified as a blackboard image. In one embodiment, the threshold upon which the classification is based may be defined following an evaluation of hundreds of test image sets. From operation 620, the routine 600 then ends.

Figure 7:
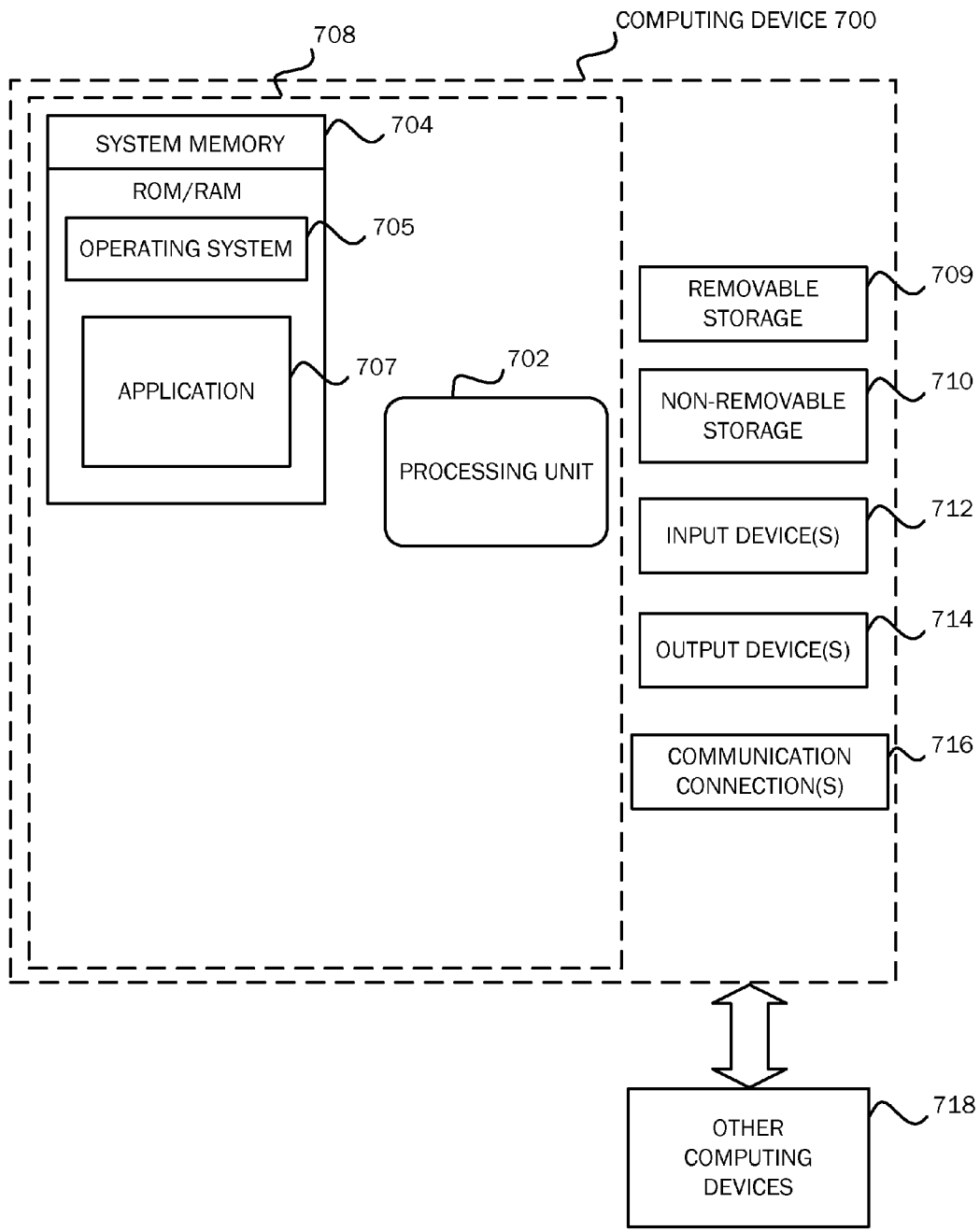
FIG. 7 is a simplified block diagram of a computing device with which various embodiments may be practiced.
Figure 8A:
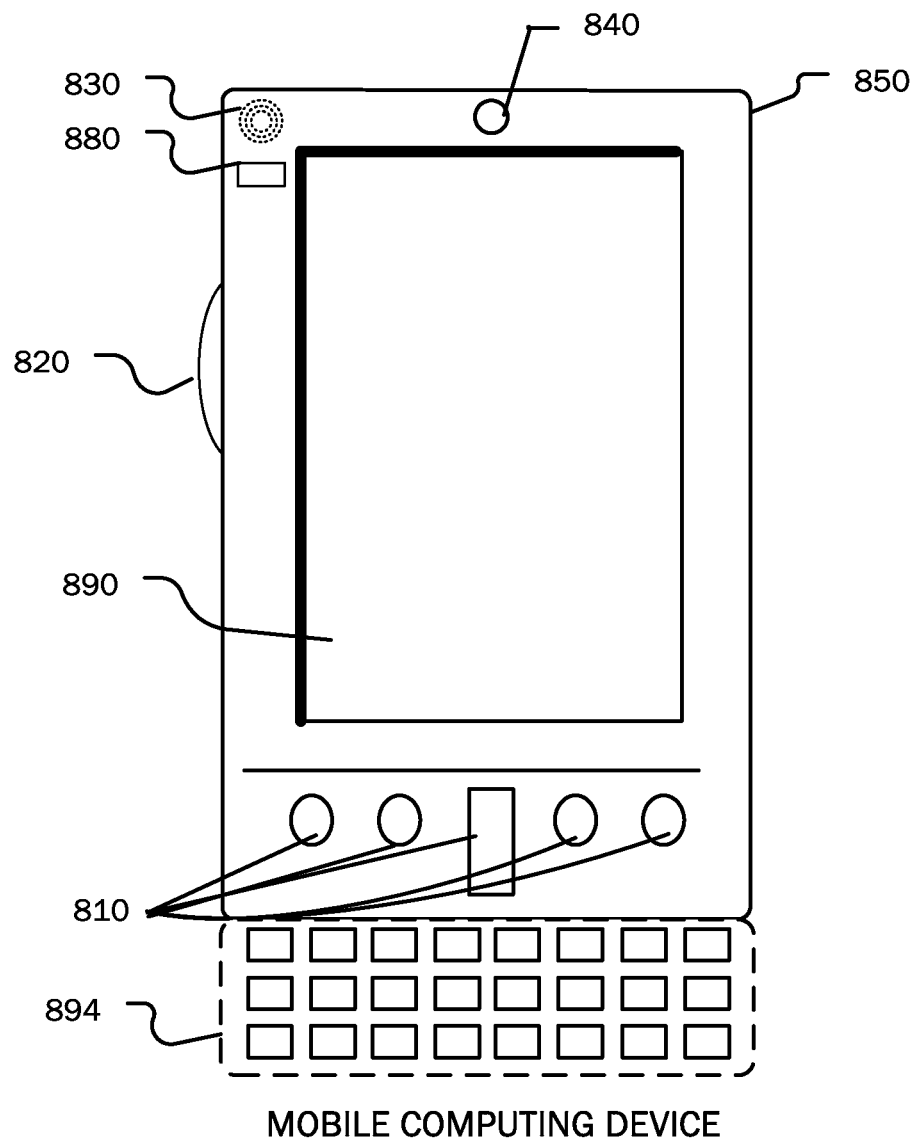
FIG. 8A is a simplified block diagram of a mobile computing device with which various embodiments may be practiced.
Figure 8B:
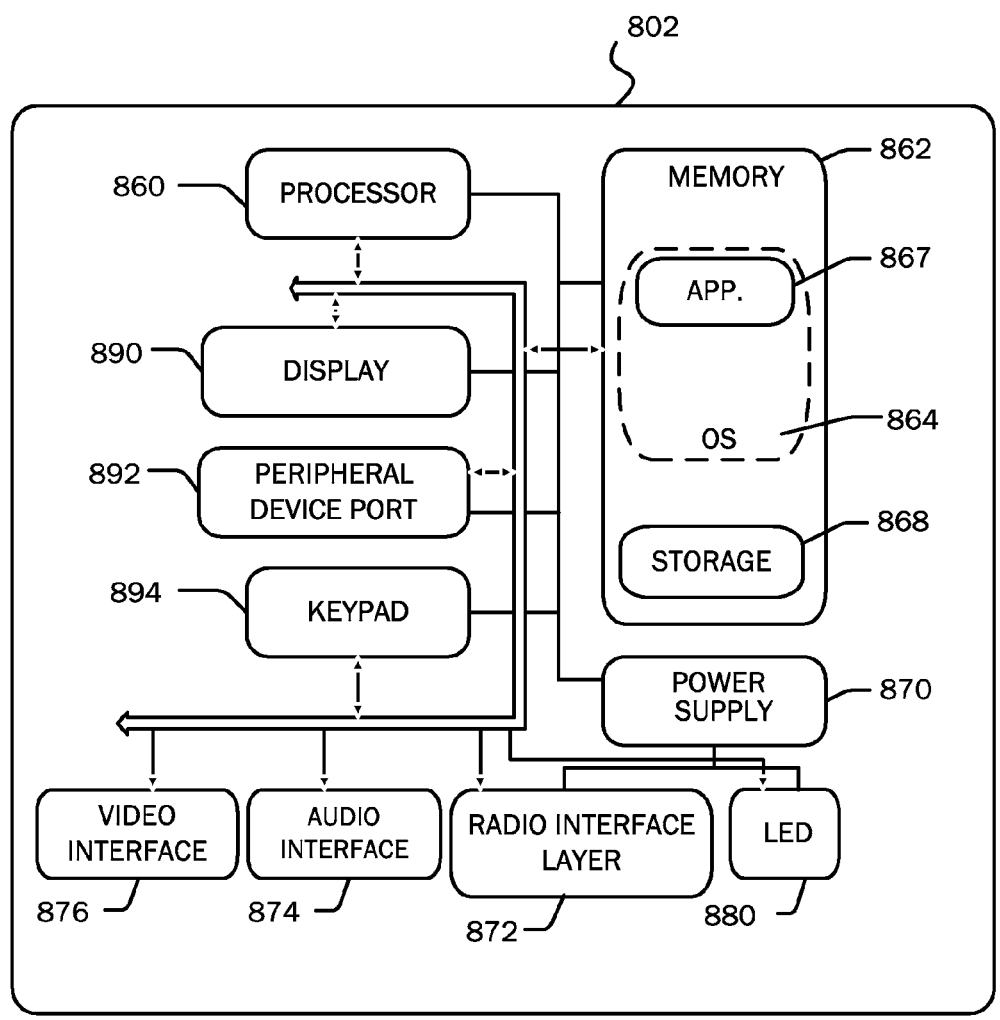
FIG. 8B is a simplified block diagram of a mobile computing device with which various embodiments may be practiced.
Figure 9:
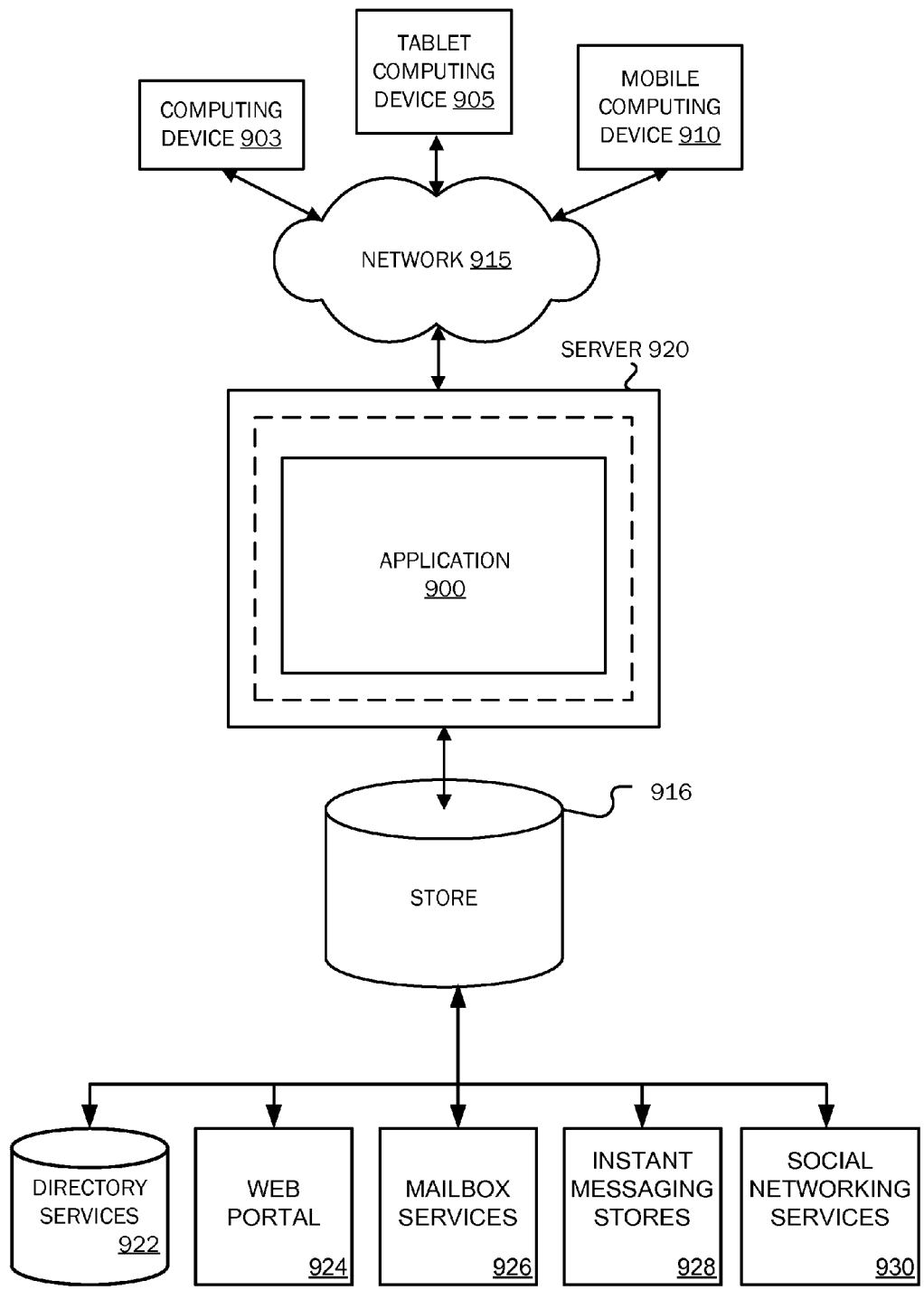
FIG. 9 is a simplified block diagram of a distributed computing system in which various embodiments may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating example physical components of a computing device 700 with which various embodiments may be practiced. In a basic configuration, the computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include an operating system 705 and application 707. Operating system 705, for example, may be suitable for controlling the computing device 700's operation and, in accordance with an embodiment, may comprise the WINDOWS operating systems from MICROSOFT CORPORATION of Redmond, Wash. The application 707, for example, may comprise functionality for performing routines including, for example, performing image processing, as described above with respect to the operations in routines 300-600 of FIGS. 3-6.

The computing device 700 may have additional features or functionality. For example, the computing device 700 may also include additional data storage devices (removable and/or non-removable) such as, for example, magnetic disks, optical disks, solid state storage devices ("SSD"), flash memory or tape. Such additional storage is illustrated in FIG. 7 by a removable storage 709 and a non-removable storage 710. The computing device 700 may also have input device(s) 712 such as a keyboard, a mouse, a pen, a sound input device (e.g., a microphone), a touch input device for receiving gestures, an accelerometer or rotational sensor, etc. Output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 700 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a suitable mobile computing environment, for example, a mobile computing device 850 which may include, without limitation, a smartphone, a tablet personal computer, a laptop computer and the like, with which various embodiments may be practiced. With reference to FIG. 8A, an example mobile computing device 850 for implementing the embodiments is illustrated. In a basic configuration, mobile computing device 850 is a handheld computer having both input elements and output elements. Input elements may include touch screen display 825 and input buttons 810 that allow the user to enter information into mobile computing device 850. Mobile computing device 850 may also incorporate an optional side input element 820 allowing further user input. Optional side input element 820 may be a rotary switch, a button, or any other type of manual input element. In alternative embodiments, mobile computing device 850 may incorporate more or less input elements. In yet another alternative embodiment, the mobile computing device is a portable telephone system, such as a cellular phone having display 825 and input buttons 810. Mobile computing device 850 may also include an optional keypad 805. Optional keypad 805 may be a physical keypad or a "soft" keypad generated on the touch screen display.

Mobile computing device 850 incorporates output elements, such as display 825, which can display a graphical user interface (GUI). Other output elements include speaker 830 and LED 880. Additionally, mobile computing device 850 may incorporate a vibration module (not shown), which causes mobile computing device 850 to vibrate to notify the user of an event. In yet another embodiment, mobile computing device 850 may incorporate a headphone jack (not shown) for providing another means of providing output signals.

Although described herein in combination with mobile computing device 850, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 8B is a block diagram illustrating components of a mobile computing device used in one embodiment, such as the mobile computing device 850 shown in FIG. 8A. That is, mobile computing device 850 can incorporate a system 802 to implement some embodiments. For example, system 802 can be used in implementing a "smartphone" that can run one or more applications similar to those of a desktop or notebook computer. In some embodiments, the system 802 is integrated as a computing device, such as an integrated personal digital assistant (PDA) and wireless phone.

Application 867 may be loaded into memory 862 and run on or in association with an operating system 864. The system 802 also includes non-volatile storage 868 within memory the 862. Non-volatile storage 868 may be used to store persistent information that should not be lost if system 802 is powered down. The application 867 may use and store information in the non-volatile storage 868. The application 867, for example, may comprise functionality for performing routines including, for example, performing image processing, as described above with respect to the operations in routines 300-600 of FIGS. 3-6. A synchronization application (not shown) also resides on system 802 and is programmed to interact with a corresponding synchronization application resident on a host computer to keep the information stored in the non-volatile storage 868 synchronized with corresponding information stored at the host computer. As should be appreciated, other applications may also be loaded into the memory 862 and run on the mobile computing device 850.

The system 802 has a power supply 870, which may be implemented as one or more batteries. The power supply 870 might further include an external power source, such as an AC adapter or a powered docking cradle that supplements or recharges the batteries.

The system 802 may also include a radio 872 (i.e., radio interface layer) that performs the function of transmitting and receiving radio frequency communications. The radio 872 facilitates wireless connectivity between the system 802 and the "outside world," via a communications carrier or service provider. Transmissions to and from the radio 872 are conducted under control of OS 864. In other words, communications received by the radio 872 may be disseminated to the application 867 via OS 864, and vice versa.

The radio 872 allows the system 802 to communicate with other computing devices, such as over a network. The radio 872 is one example of communication media. The embodiment of the system 802 is shown with two types of notification output devices: the LED 880 that can be used to provide visual notifications and an audio interface 874 that can be used with speaker 830 to provide audio notifications. These devices may be directly coupled to the power supply 870 so that when activated, they remain on for a duration dictated by the notification mechanism even though processor 860 and other components might shut down for conserving battery power. The LED 880 may be programmed to remain on indefinitely until the user takes action to indicate the powered-on status of the device. The audio interface 874 is used to provide audible signals to and receive audible signals from the user. For example, in addition to being coupled to speaker 830, the audio interface 874 may also be coupled to a microphone (not shown) to receive audible (e.g., voice) input, such as to facilitate a telephone conversation. In accordance with embodiments, the microphone may also serve as an audio sensor to facilitate control of notifications. The system 802 may further include a video interface 876 that enables an operation of on-board camera 840 to record still images, video streams, and the like.

A mobile computing device implementing the system 802 may have additional features or functionality. For example, the device may also include additional data storage devices (removable and/or non-removable) such as, magnetic disks, optical disks, or tape. Such additional storage is illustrated in FIG. 8B by storage 868.

Data/information generated or captured by the mobile computing device 850 and stored via the system 802 may be stored locally on the mobile computing device 850, as described above, or the data may be stored on any number of storage media that may be accessed by the device via the radio 872 or via a wired connection between the mobile computing device 850 and a separate computing device associated with the mobile computing device 850, for example, a server computer in a distributed computing network such as the Internet. As should be appreciated such data/information may be accessed via the mobile computing device 850 via the radio 872 or via a distributed computing network. Similarly, such data/information may be readily transferred between computing devices for storage and use according to well-known data/information transfer and storage means, including electronic mail and collaborative data/information sharing systems.

FIG. 9 is a simplified block diagram of a distributed computing system in which various embodiments may be practiced. The distributed computing system may include number of client devices such as a computing device 903, a tablet computing device 905 and a mobile computing device 910. The client devices 903, 905 and 910 may be in communication with a distributed computing network 915 (e.g., the Internet). A server 920 is in communication with the client devices 903, 905 and 910 over the network 915. The server 920 may store application 900 which may be perform routines including, for example, performing image processing, as described above with respect to the operations in routines 300-600 of FIGS. 3-6. Content developed, interacted with, or edited in association with the application 900 may be stored in different communication channels or other storage types. For example, various documents may be stored using a directory service 922, a web portal 924, a mailbox service 926, an instant messaging store 928, or a social networking site 930.

The application 900 may use any of these types of systems or the like for enabling data utilization, as described herein. The server 920 may provide the proximity application 900 to clients. As one example, the server 920 may be a web server providing the application 900 over the web. The server 920 may provide the application 900 over the web to clients through the network 915. By way of example, the computing device 10 may be implemented as the computing device 903 and embodied in a personal computer, the tablet computing device 905 and/or the mobile computing device 910 (e.g., a smart phone). Any of these embodiments of the computing devices 903, 905 and 910 may obtain content from the store 916.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of image processing for productivity applications comprising:

receiving, by a computing device, an image;
detecting, by the computing device, a plurality of edges comprising the received image;
adjusting, by the computing device, the received image based on a skew state of the detected plurality of edges; and
processing, by the computing device, the adjusted image to correct imbalances, wherein the processing comprises:
determining, by the computing device, an image classification that identifies a type of markboard associated with the image based on an analysis of an image histogram of color values from the image, and
adjusting, by the computing device, the image based on the determined image classification.

2. The method of claim 1, wherein receiving, by a computing device, an image comprises receiving one or more of a whiteboard image and a document image from an image capture device.

3. The method of claim 1, wherein receiving, by a computing device, an image comprises receiving, from a camera roll, at least one selected from a group consisting of: a whiteboard image and a blackboard image.

4. The method of claim 1, wherein receiving, by a computing device, an image comprises receiving a document image from a camera roll.

5. The method of claim 1, wherein adjusting, by the computing device, the received image based on a skew state of the detected plurality of edges comprises:
determining that one or more of the plurality of edges is misaligned;
enumerating one or more quadrangle candidates;
assigning a score to each of the one or more quadrangle candidates;
choosing a quadrangle having the highest score from the one or more quadrangle candidates; and
adjusting the one or more of the plurality of edges determined to be misaligned to form the quadrangle having the highest score.

6. The method of claim 1, wherein processing, by the computing device, the adjusted image to correct imbalances comprises:
applying tuned color effects to the image based on the determined image classification; and
adjusting a color balance of the image based on the tuned color effects based on the determined image classification.

7. The method of claim 1, wherein the determining of the image classification further comprises:
building the image histogram of color values from the received image to determine a brightness level;
calculating a mean value from the image histogram; and
calculating a standard deviation based on the mean value.

8. The method of claim 7, wherein the determining of the image classification comprises:
determining that the image is a whiteboard image when a difference between the standard deviation and the mean value is greater than a threshold; and
determining that the image is a blackboard image when the difference between the standard deviation and the mean value is less than or equal to the threshold.

9. A computing device comprising:
a memory for storing executable program code; and
a processor, functionally connected with the memory, the processor being responsive to computer-executable instructions contained in the program code and operative to:
receive an image from an image capture device;
detect a plurality of edges comprising the received image;
adjust the received image based on a skew state of the detected plurality of edges; and
process the adjusted image to correct imbalances, wherein processing of the adjusted image comprises:
determining an image classification that identifies a type of markboard associated with the image based on an analysis of an image histogram of color values from the image, and
adjusting the image based on the determined image classification.

10. The computing device of claim 9, wherein the processor, in adjusting the received image based on a skew state of the detected plurality of edges, is operative to:
determine that one or more of the plurality of edges is misaligned;
enumerate one or more quadrangle candidates;
assign a score to each of the one or more quadrangle candidates;
choose a quadrangle having the highest score from the one or more quadrangle candidates; and
adjust the one or more of the plurality of edges determined to be misaligned to form the quadrangle having the highest score.

11. The computing device of claim 9, wherein the processor, in processing the adjusted image to correct imbalances, is operative to:
apply tuned color effects to the image based on the determined image classification; and
adjust a color balance of the image based on the tuned color effect based on the determined image classification.

12. The computing device of claim 9, wherein the processor, in determining the image classification, is operative to:
build the image histogram of color values from the received image to determine a brightness level;
calculate a mean value from the image histogram; and
calculate a standard deviation based on the mean value.

13. The computing device of claim 12, wherein the processor, in determining the image classification, is further operative to:
determine that the image is a whiteboard image when a difference between the standard deviation and the mean value is greater than a threshold; and
determine that the image is a blackboard image when the difference between the standard deviation and the mean value is less than or equal to the threshold.

14. A computer-readable storage medium storing computer executable instructions which, when executed by a computer, will cause computer to perform a method of image processing for productivity applications, the method comprising:
receiving a photograph of an image;
detecting, by the computing device, a plurality of edges comprising the image;
adjusting the image based on a skew state of the detected plurality of edges;
processing the adjusted image to correct imbalances;
assigning a classification, selected from one of a plurality of image categories, to the processed image by:
building a histogram of color values from the received image to determine a brightness level;
calculating a mean value from the histogram;

calculating a standard deviation based on the mean value;

determining that the processed image is a whiteboard image when a difference between the standard deviation and the mean value is greater than a threshold; and determining that the processed image is a blackboard image when the difference between the standard deviation and the mean value is not greater than the threshold; and adjusting the processed image based on the assigned image classification.

15. The computer-readable storage medium of claim 14, wherein the photographed image comprises one or more of a whiteboard image and a document image from an image capture device.

16. The computer-readable storage medium of claim 14, wherein the photographed image comprises one or more of a whiteboard image and a document image retrieved from a camera roll.

17. The computer-readable storage medium of claim 14, wherein adjusting the image based on a skew state of the detected plurality of edges comprises:

determining that one or more of the plurality of edges is misaligned;

enumerating one or more quadrangle candidates;

assigning a score to each of the one or more quadrangle candidates;

choosing a quadrangle having the highest score from the one or more quadrangle candidates; and adjusting the one or more of the plurality of edges determined to be misaligned to form the quadrangle having the highest score.

18. The computer-readable storage medium of claim 14, wherein processing the adjusted image to correct imbalances comprises:

applying tuned color effects to the image; and adjusting a color balance of the image based on the tuned color effects.

19. The computer-readable storage medium of claim 14, wherein applying tuned color effects to the image comprises performing a histogram analysis of the image by calculating white point, black point and contrast.

20. The method of claim 1, wherein the determining of the image classification further comprises: using color values of the image histogram to determine one or more brightness levels of the image, and classifying the image as one selected from a group consisting of: a whiteboard image and a blackboard image.

* * * * *